J. HUGHES.

LANTERN.

No. 7,472. Reissued Jan. 23, 1877.

Witnesses:

T. C. Brocht

J. G. Talcott.

Inventor:

John Hughes by Bakewell & Kerr

Attys

N. PETERS, PHOTO-LITHOGRAPHER, WASHINGTON, D. C.

UNITED STATES PATENT OFFICE.

JOHN HUGHES, OF BUCHANAN, PENNSYLVANIA.

IMPROVEMENT IN LANTERNS.

Specification forming part of Letters Patent No. 93,535, dated August 10, 1869; reissue No. 7,472, dated January 23, 1877; application filed January 19, 1877.

*To all whom it may concern:*

Be it known that I, JOHN HUGHES, of Buchanan, in the county of Allegheny and State of Pennsylvania, have invented a new and useful Improvement in Guard-Lanterns; and I do hereby declare the following to be a full, clear, and exact description thereof, reference being had to the accompanying drawings, forming part of this specification, in which—

Figure 1:
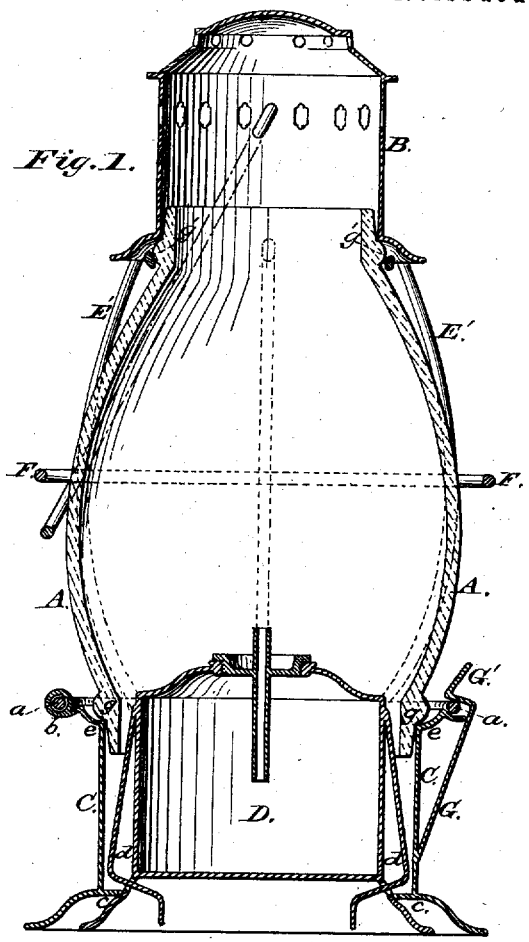
Figure 1:
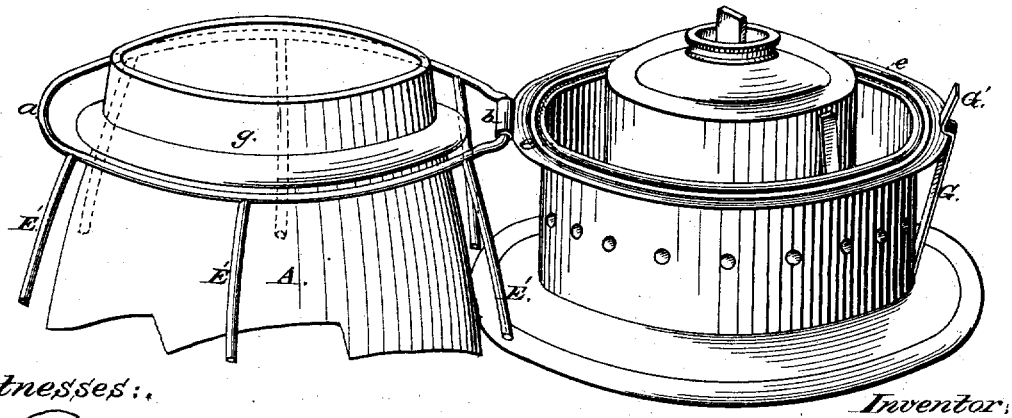

Figure 1 is a vertical section of a lantern embodying my invention. Fig. 2 is a perspective view of a lantern, the guard-frame and globe thrown down, illustrating my invention.

Like letters refer to like parts wherever they occur.

My invention relates to the construction of portable lanterns, which are adapted to receive and hold in place removable globes; and consists, first, in hinging the base to the guard-frame by means of an offset on the base-ring of the guard-frame, which forms the pintle of the hinge-connection and permits the guard-frame to describe a half-circle, thus avoiding undue strain upon the hinge and permitting the ready removal of the globe when desired; second, in making the upper flange of the base-section with an annular corrugation, which forms a depressed seat for the base of the globe and permits the globe to clear the base-section when the guard-frame is turned back; and, finally, in details of construction hereinafter specified.

I will now proceed to describe my invention, so that others skilled in the art to which it appertains may make and use the same.

In the drawings, A represents the removable globe of the lantern, which is constructed with circular-contracted portions, provided with annular external ribs *g g'*. B is the perforated top of the lantern, to which the upper ends of the vertical wires E' of the guard-frame are secured, usually by bending the ends inwardly and soldering them to the base-flange of said top or cap B. The lower ends of the vertical wires E' are secured to a base-ring, *a*, and at an intermediate point between the ring *a* and cap B the strengthening-ring F is secured to wires E', thus completing the guard-frame. C indicates the base-section of the lantern, provided with a removable lamp, D, and constructed with an internal flange, *c*, near its bottom, to receive the spring supports and fastenings *d* of the lamp, as shown in Fig. 1. The upper portion of this base-section is constructed with a flange, *e*, which is corrugated to stiffen it, and also to afford a depressed seat for the bulge at the terminus of the lower contracted portion *g* of the glass globe, and to facilitate the clearance of the lower end of the globe when the frame is turned back. To the circumference of this flange *e* the base-ring of the guard-frame is connected by a strap, *b*, which is soldered or riveted to the flange, so as to form a hinge-connection of the guard-frame to the base-section of the lantern.

To hinge this ring in the best manner it is necessary not only to bend the base-wire out of a true circle, but also to straighten that portion of it which is to form the pintle of the eye-piece *b*. (This is shown clearly in Fig. 2.) One advantage of the last-mentioned construction is that the base-ring will not shift so as to bring one of the vertical wires of the guard-frame opposite the locking-catch.

Opposite the hinge-connection a spring-strip, G, is secured to the base C below flange *e*, and extends up and over this flange, so as to form a catch with an outwardly-inclined finger-piece, G', which catch will receive beneath it the ring *a*, and firmly hold this ring and the flange *e* together, as shown in Fig. 1.

It will be seen from the above description that the glass globe A is held in place between the cap B and base C without cement; consequently it can be removed at pleasure, for cleaning it or for substituting a good globe for a broken one; also, that the base-ring *a* of the guard-frame serves as a pintle for the hinge-connection of the frame with base C; also, that the base-ring *a* serves, in conjunction with a spring catch, as a means for securing the hinged sections of the lantern in the condition represented in Fig. 1.

These features, all combined in the manner shown and described, admit of lanterns being made strong and substantial, and at the same time their cost, as compared with lanterns hitherto made, is greatly diminished.

Having thus described my invention, what I claim, and desire to secure by Letters Patent, is—

1. The combination of the base-section and the hinged guard, the base-ring of the latter having an offset which forms the pintle of the hinge-connection, substantially as specified.

2. The combination of the base-section, the guard hinged to the base-section by an offset on its base-ring, and the external spring-catch placed opposite the point of hinging, substantially as and for the purpose specified.

3. In a lantern of the class specified, the combination of the globe and the upper flange of the base-section, the flange having the annular corrugation, which forms the depressed seat for the base of the globe, substantially as specified.

In witness whereof I, the said JOHN HUGHES, have hereunto set my hand.

JOHN HUGHES.

Witnesses:

F. W. RITTER, Jr.,

JAMES I. KAY.